T. ACKLEY.
TIMING ATTACHMENT FOR WATCHES.

No. 178,041. Patented May 30, 1876.

WITNESSES:
C. Neveux
John Goethals

INVENTOR:
T. Ackley
BY
ATTORNEYS.

UNITED STATES PATENT OFFICE.

THADDEUS ACKLEY, OF WARREN, OHIO.

IMPROVEMENT IN TIMING ATTACHMENTS FOR WATCHES.

Specification forming part of Letters Patent No. 178,041, dated May 30, 1876; application filed April 18, 1876.

*To all whom it may concern:*

Figure 1:
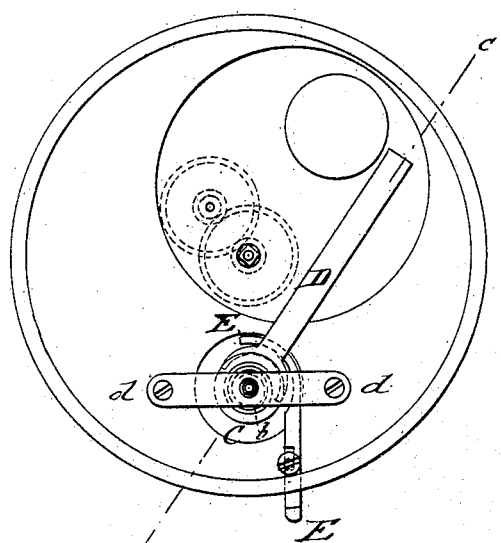
Figure 2:
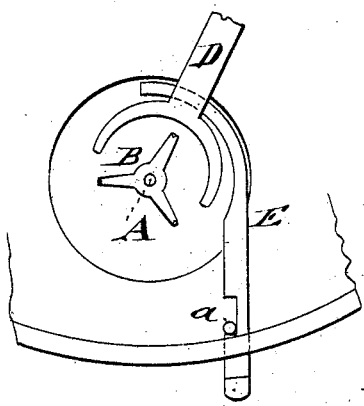
Figure 3:
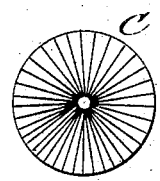
Figure 4:
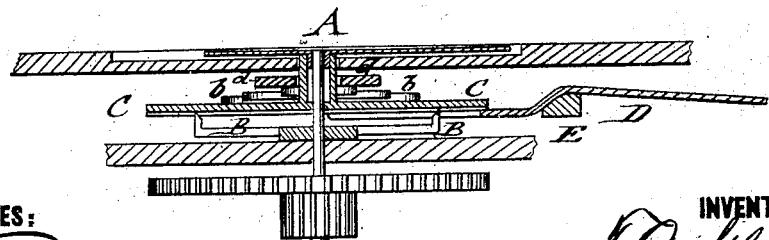

Be it known that I, THADDEUS ACKLEY, of Warren, Trumbull county, State of Ohio, have invented a new and Improved Timing Attachment to Watches, of which the following is a specification:

In the accompanying drawing, Figure 1 represents a top view of a watch-movement with my improved timing attachment. Fig. 2 represents a top view of the stopping mechanism of the second-hand, on an enlarged scale. Fig. 3 represents a detail bottom view of the grooved disk for moving the second-hand; and Fig. 4 represents a vertical transverse section on line $c\ c$, Fig. 1, of the timing mechanism, on an enlarged scale.

Similar letters of reference indicate corresponding parts.

My invention relates to an improved timing attachment for watches to be used for races and other purposes; and the invention consists of an attachment to the second-hand of the watch, by which the same may be stopped and released at will to indicate the time taken up by a race.

In the drawing, A represents the arbor of the second-hand of a watch, to which is keyed a catch, B, with radial arms, having spurred ends. A disk, C, that carries the second-hand in its center sleeve or tube, is made to slide loosely on the arbor A, and provided with radial grooves at the under side, as shown in Fig. 3, so that the spurred ends of catch B engage the same, and secure the regular movement of the hand as long as the disk is in contact with the catch. A spring, D, is attached rigidly at one end to the watch-movement, and extended by its arc-shaped free end under the grooved disk, so as to raise or lower it by the action of a sliding lever, E, that acts on the free end, as shown in Figs. 2 and 4.

The lever E is operated by a small button from the outside of the watch-case, and allowed to slide in either direction by a recess and stop-pin $a$, so as to raise or lower spring F, and throw thereby the grooved disk out of or into contact with the spurred catch.

A spiral spring, $b$, is arranged between a top plate, $d$, and the grooved disk C, and serves to throw the disk into contact with the spurred catch at the instant when the lever releases the disk-lifting spring. The spurred catch engages the grooved disk at any position, so as to instantly turn the same with the arbor, and move thereby the second-wheel. By pulling out the controlling-lever the disk is detached from the spurred catch, and thereby the second-hand stopped, the lever being pushed in at the moment when the timing is to begin, so that the second-hand moves until, by pulling out the lever, the second-hand is stopped again, so that the time taken up by the race is, in reliable and convenient manner, obtained by a simple and easily-operated attachment to the watch.

I am aware that in watches for timing races crescent-shaped friction-springs and a smooth disk have been employed to carry the second-hand; but this is liable to lose or gain, and to be influenced by the slighest jars, while by my serrated disk, clutch, and coil-spring the friction becomes inappreciable, the indications of second-hand reliable, and the timing for all practical purposes perfect; hence,

What I claim as new and of my invention is—

In a watch for timing races, the combination, with second-hand arbor, of serrated disk, clutch, and coil-spring, arranged substantially as shown and described.

THADDEUS ACKLEY.

Witnesses:
L. F. HUNTER,
F. H. ERNST.